US006655885B2

(12) United States Patent
Trauthwein

(10) Patent No.: US 6,655,885 B2
(45) Date of Patent: Dec. 2, 2003

(54) TIE DOWN BAR FOR MOTORCYCLES

(76) Inventor: Robert C. Trauthwein, 12517 Tall Oaks Dr., Cedar Lake, IN (US) 46303

( * ) Notice: Subject to any disclaimer, the term of this patent is extended or adjusted under 35 U.S.C. 154(b) by 3 days.

(21) Appl. No.: 10/073,332

(22) Filed: Feb. 13, 2002

(65) Prior Publication Data

US 2003/0152436 A1 Aug. 14, 2003

Related U.S. Application Data

(60) Provisional application No. 60/289,802, filed on May 10, 2001.

(51) Int. Cl.[7] .................................................. B60P 7/08
(52) U.S. Cl. ............................ 410/97; 410/3; 410/100
(58) Field of Search ............................ 410/2, 3, 23, 34, 410/96, 97, 99, 100, 120; 224/534, 924; 248/498

(56) References Cited

U.S. PATENT DOCUMENTS

| 2,787,476 | A | * | 4/1957 | Holsclaw | |
|---|---|---|---|---|---|
| 5,259,711 | A | * | 11/1993 | Beck | 410/104 |
| 5,326,202 | A | * | 7/1994 | Stubbs | 410/3 |
| 5,516,020 | A | | 5/1996 | Lawler et al. | |
| 5,529,448 | A | | 6/1996 | Kosma | 410/97 |
| 5,833,412 | A | * | 11/1998 | Valencia et al. | 410/2 |
| 6,065,914 | A | * | 5/2000 | Fotou | 410/3 |
| 6,099,219 | A | * | 8/2000 | Bartholomay | 410/20 |
| 6,171,034 | B1 | * | 1/2001 | Burgoon et al. | 410/3 |
| 6,331,094 | B1 | * | 12/2001 | Burrows | 410/30 |
| 6,524,041 | B1 | * | 2/2003 | Voiculescu | 410/100 |

FOREIGN PATENT DOCUMENTS

GB          700968       12/1953

* cited by examiner

*Primary Examiner*—Stephen T. Gordon
(74) *Attorney, Agent, or Firm*—Richard C. Litman

(57) ABSTRACT

A tie down device for securing modern sport type motorcycles having a full fairing to a truck or trailer bed without damaging the fairing. The device has a support T-bar that is secured to the central portion of the steering area of the motorcycle by a central stabilizer rod. The T-bar includes a tie down bar perpendicular to a stabilizer rod having a height stop. The stabilizer rod fits within a center-bored nut on the steering stem and into the frame neck of most sport motorcycles. Adjacent to and spaced inward from each end of the tie down bar are handle bar stabilizing hooks and tie down eyelets for attachment of standard tie down straps The invention provides tie down points for securing the motorcycle without attaching the tie down straps to the motorcycle, thus avoiding damage to the fairing and handle bars.

20 Claims, 2 Drawing Sheets

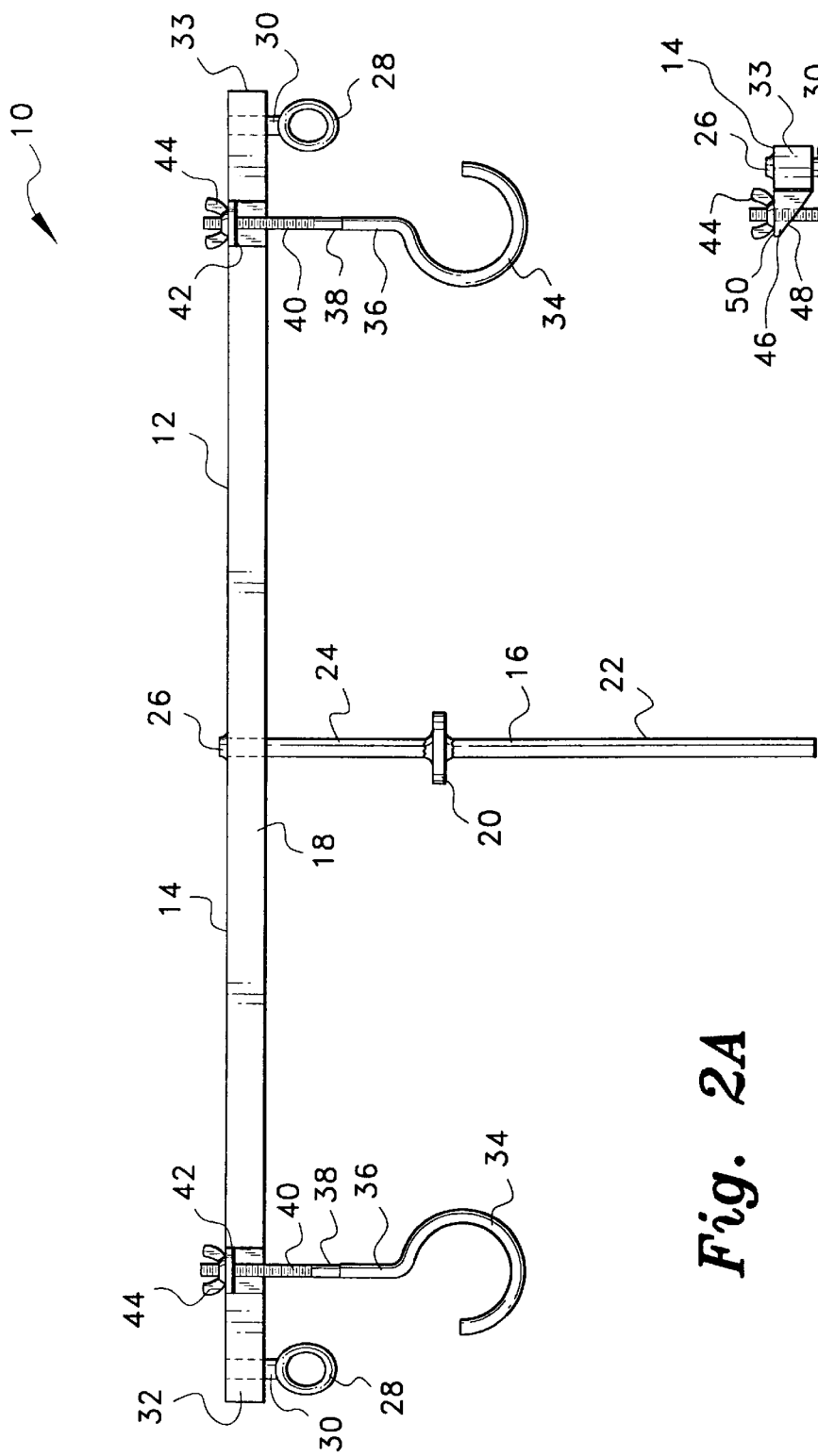
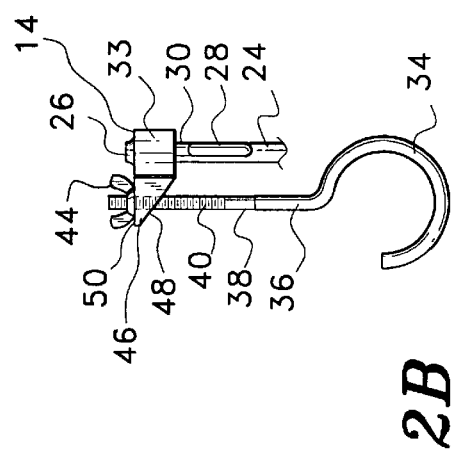
Fig. 2A
Fig. 2B

TIE DOWN BAR FOR MOTORCYCLES

CROSS-REFERENCE TO RELATED APPLICATIONS

This application claims benefit of provisional application No. 60/289,802, filed on May 10, 2001.

BACKGROUND OF THE INVENTION

1. Field of the Invention

The present invention relates to tie down devices. More particularly, the present invention relates to tie down devices for a motorcycle during transport on a trailer or truck bed.

2. Description of Related Art

Present motorcycle tie down devices for use when transporting a motorcycle on a trailer or truck bed risk damage to the full fairing of a modern sport motorcycle. Straps attached to handle bars may result in bending of the bars during use. Straps attached to the central steering portion of the handle bars may result in damage to the fairing during tie down. It would be desirable to have a device which may be attached to the motorcycle to which tie down straps may be attached away from the body of the motorcycle without danger of damaging the fairing. It would further be desirable to provide such a device which will secure the handle bars without the risk of bending the bars during transport.

U.K. patent document 700,968, published December 1953, describes a device for securing motorcycles in transport vehicles. The device has a part shaped to fit over the saddle of the motorcycle and rings for the attachment of securing lines. The device of the '968 patent would not be appropriate for modern full fairing sport motorcycles.

U.S. Pat. No. 5,516,020, issued May 14, 1996, to Lawler, et al., describes a truck bed mount bicycle rack. A bicycle is held securely in the rack by a C-shaped hook or clamp that fits around the steering neck frame of the bicycle frame mounting and is secured with a specially designed locknut. The device of the '020 patent would result in damage to the fairing of a sport motorcycle as discussed above.

U.S. Pat. No. 5,529,448, issued Jun. 25, 1996, to Kosma. describes an adjustable hand grip mount for securing a motorcycle to a transportation vehicle. The hand grip mount includes a telescopic frame and a pair of tubular receptacles for receiving the hand grips of the motorcycle. The tubular frame has a strap hole at each end for receiving tie straps. The handle bars on a modern sport motorcycle are light in construction and subject to bending if used for tie down points as in the '448 patent.

None of the above inventions and patents, taken either singly or in combination, is seen to describe the instant invention as claimed:

SUMMARY OF THE INVENTION

A tie down device for securing modern sport type motorcycles having a full fairing to a truck or trailer bed without damaging the fairing or handle bars. The device includes a tie down bar that is secured to the central portion of the steering area of the motorcycle by a central stabilizer rod. The stabilizer rod is perpendicular to the tie down bar forming a T-bar and includes a height stop. The stabilizer rod fits within a center-bored nut on the steering stem and into the frame neck which connects upper and lower triple clamps. These are common features of most sport motorcycles. Adjacent to each end of the tie down bar are handle bar stabilizing hooks and tie down rings or eyelets for attachment of standard tie down straps. The invention provides tie down points for securing the motorcycle without attaching the tie down straps to the motorcycle, thus avoiding damage to the fairing.

Accordingly, it is a principal object of the invention to provide for the tie down of a full fairing sport motorcycle without damaging the fairing.

It is another object of the invention to provide a T-shaped device as above which attaches at the steering mechanism and provides an extended bar reaching past the fairing on each side of the motorcycle where tie down rings are provided.

It is a further object of the invention to provide a device as above which is useful with standard tie down straps.

It is still another object of the invention to provide a device as above which includes adjustable handle bar stabilizers which reach from the extended bar to engage the handle bars of the motorcycle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification. and drawings.

BRIEF DESCRIPTION OF THE DRAWINGS

FIG. 2A is a front elevational view of the tie down bar for mounting tie down straps as above.

FIG. 2B is a side elevation view of an alternative support for mounting the handlebar stabilizing hooks on the tie down bar.

Similar reference characters denote corresponding features consistently throughout the attached drawings.

DETAILED DESCRIPTION OF THE PREFERRED EMBODIMENT

Figure 1:
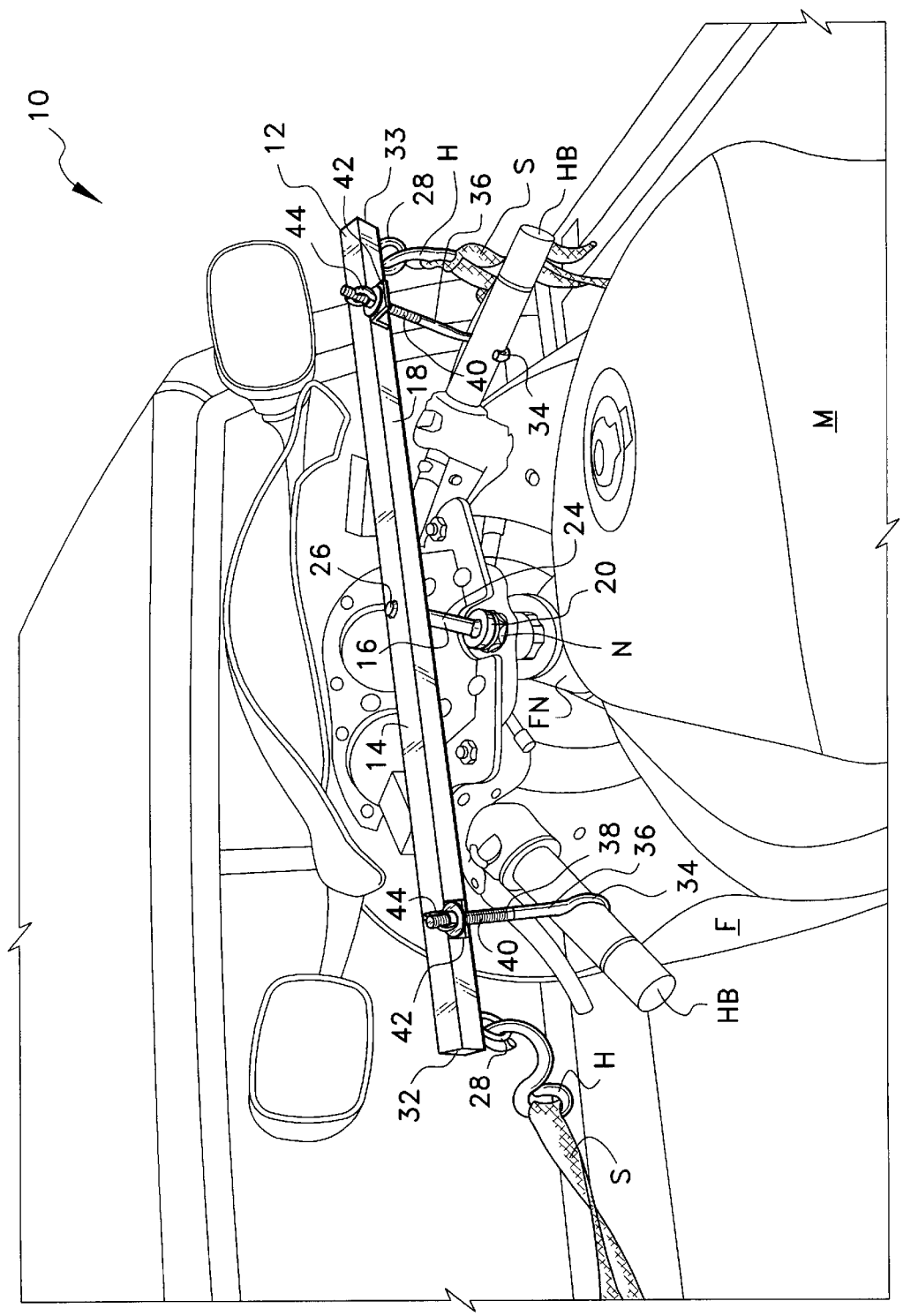
FIG. 1 is an environmental, top perspective view of a tie down bar for mounting tie down straps for motorcycles according to the present invention.

The present invention is a tie down device for securing modern sport type motorcycles having a full fairing to a truck or trailer bed without damaging the fairing. The device has a support T-bar that is secured to the central portion of the steering area of the motorcycle by a central stabilizer rod. The stabilizer rod is perpendicular to a tie down bar and includes a height stop. The stabilizer rod fits within a center-bored nut on the steering stem and into the frame neck of a motorcycle, which connects upper and lower triple clamps. These are common features for most sport motorcycles. Adjacent to each end of the tie down bar are handle bar stabilizing hooks and tie down rings or eyelets for attachment of standard tie down straps. The invention provides tie down points for securing the motorcycle without attaching the tie down straps to the motorcycle, thus avoiding damage to the fairing and handle bars.

Referring to FIGS. 1 and 2A, there are shown an environmental top perspective view and an elevation view, respectively, of the motorcycle tie down bar system 10 of the present invention. System 10 includes motorcycle tie down bar assembly 12 which is in the general shape of a T-bar having horizontally disposed tie down bar 14 and central stabilizer rod 16 attached perpendicular to tie down bar central portion 18 and bisecting tie down bar 14. Stabilizer rod 16 is a rod or tube affixed to said tie down bar 14, such as by welding. Stabilizer rod 16 has a rod height stop 20, mounted perpendicular to and located at a point along the length of the stabilizer rod 16 and defining lower rod 22 and upper rod 24. Stabilizer rod 16 is affixed at its upper end 26 to tie down bar 14 to form a "T" shaped structure.

when installed as in FIG. 1, stabilizer rod 16 is inserted through the central bore of nut N and into the frame neck FN of motorcycle M. The clearance between the nut N of the motorcycle to the tie down bar 14 is determined by the location of rod height stop 20 on stabilizer rod 16, thus defining the length of upper rod 24. Upper rod 24 is affixed at its upper end 26 to tie down bar 14 as by welding. The length of lower rod 22 may be of any appropriate length, limited by the space available in frame FN.

Tie down bar 14 extends generally crosswise of motorcycle M and tie down rings 28 are attached to tie down bar 14 by ring studs 30 in tie down bar left end portion 32 and tie down bar right end portion 33, respectively. Tie down bar 14 is of sufficient length that tie down rings 28 may be accessed with tie down straps S by means of connection hooks H, leaving tie down straps S physically clear of the fairing F of motorcycle M so as to avoid any possible damage to the fairing F. Tie down bar 14 is preferably a rectangular conduit or a channel shaped member opening downward and may have open or closed end portions 32 and 33. Rings 28 and ring studs 30 may be provided in the form of eyelets as desired.

Handle bar hooks 34 are located at end portions 32 and 33 and spaced inwardly from tie down rings 28. Handle bar hooks 34 are adjustable to fit over handle bars HB to maintain them in a steady position while the motorcycle is transported. Handle bar hooks 34 have a covering 36 of cushioning material such as plastic in the hook area to avoid scarring the handle bars. Handle bar hooks 34 have hook shafts 38 with threaded portions 40, which are inserted through bored tabs 42, mounted on tie down bar 14. Handle bar hooks 34 are mounted around handle bars HB and are tightened as desired by turning hook shaft wing nuts 44 on shaft threaded portions 40 downward against hook shaft tabs 42, respectively. Tabs 42 are attached to tie down bar 14 and may be formed by cutting a vertical wall of tie down bar 14, bending it to the horizontal, and making a bore therethrough for inserting shaft threaded portions 40. In this manner handle bars HB are held in a steady position.

Referring to FIG. 2B, there is shown an end view of the tie down bar assembly of FIG. 2 where hook support 46 is shown as an alternative to vertically bored tab 42. Hook supports 46 have triangular side supports 48 for supporting horizontal portions 50 relative to a vertical wall of tie down bar 14 and may be attached thereto by welding. Horizontal portions 50 are similar to tabs 42, having a bore therethrough (not shown) for inserting shaft threaded portions 40.

The tie down bar assembly 10 of the present invention may be constructed of appropriate materials such as steel, aluminum, or other appropriate metals and plastics as desired.

The tie down bar assembly of the present invention may be modified in a known manner to fit various motorcycle configurations. As an example, for a year 1999 to 2001 Suzuki GSX 1300R motorcycles, the tie down bar may be about 30 inches long with the center-mounted stabilizer about 9 inches long overall with a height stop located about 4 1/4 inches below the tie down bar 14.

It is to be understood that the present invention is not limited to the sole embodiments described above, but encompasses any and all embodiments within the scope of the following claims.

I claim:

1. A tie down bar assembly for a faired sport motorcycle comprising:

a horizontally disposed tie down bar having a central portion, a right end portion, and a left end portion;

a stabilizer rod having an upper end attached to and bisecting said bar and disposed perpendicular thereto to form a T-bar configuration;

said stabilizer rod being so configured as to be mountable along its length to said motorcycle in the vicinity of the steering mechanism of said motorcycle; and means for receiving the hooks of tie down straps mounted at each said end portion of said tie down bar and disposed for receiving the hooks of tie down straps;

whereby said tie down straps clear a fairing of said motorcycle when the tie down strap hooks engage said means for receiving hooks and are otherwise attached to a truck bed for transport of said motorcycle.

2. The tie down assembly of claim 1, wherein said means for receiving the hooks of tie down straps are tie down rings.

3. The tie down assembly of claim 2, further comprising studs connecting said tie down rings with said respective left end portion and right end portion of said tie down bar.

4. The tie down assembly of claim 1, wherein said means for receiving the hooks of tie down straps are eyelets connected with said respective left end portion and right end portion of said tie down bar.

5. The tie down assembly of claim 2, said stabilizer rod portion further comprising a stabilizer rod height stop located along the length thereof dividing said stabilizer rod into an upper and a lower portion, said height stop being so located and configured as to engage said motorcycle with said lower stabilizer rod portion and provide clearance with said upper stabilizer rod portion sufficient for said tie down bar to clear the handle bars and fairing of said motorcycle.

6. The tie down assembly of claim 5, further comprising a handle bar hook mounted at each of said right and said left end portions of said tie down bar and spaced inward of said tie down rings, said handle bar hooks being vertically adjustable relative to said tie down bar and so configured as to engage respective right and left handlebars of said motorcycle.

7. The tie down assembly of claim 6, each said handle bar hook further comprising a cover located on a hook portion thereof.

8. The tie down assembly of claim 6, further comprising a bored horizontal tab located at each of said right and said left end portions of said tie down bar and spaced inward of said tie down rings, said handle bar hooks being supported by said horizontal tabs for vertical adjustment.

9. The tie down assembly of claim 8, each said handle bar hook having a lower hook portion and a threaded upper shaft, and a wing nut for engagement of said shaft, said handle bar hook being insertable upward through a respective said bored horizontal tab, whereby said handle bar hook portion engages its respective handle bar, said threaded upper shaft is inserted upward through said bored horizontal tab and said wing nut is rotatably engaged with said threaded upper shaft at a point above said horizontal tab for vertical adjustment of said handle bar hook by rotating said wing nut.

10. The tie down assembly of claim 6, further comprising a hook support located at each of said right and said left end portions of said tie down bar and spaced inward of said tie down rings, each said hook support having an upper bored horizontal portion extending outward from said tie down bar and triangular side support portions extending from said horizontal portion to said tie down bar, said handle bar hooks being supported by said hook supports for vertical adjustment.

11. The tie down assembly of claim 8, each said handle bar hook having a lower hook portion and a threaded upper shaft, and a wing nut for engagement of said shaft, said handle bar hook being insertable upward through a respective said bored horizontal tab, whereby said handle bar hook portion engages its respective handle bar, said threaded upper shaft is inserted upward through said bored horizontal tab and said wing nut is rotatably engaged with said threaded upper shaft at a point above said horizontal tab for vertical adjustment of said handle bar hook by rotating said wing nut.

12. The tie down assembly of claim 5, wherein said lower stabilizer rod portion is adapted to fit into a frame neck of said motorcycle.

13. The tie down assembly of claim 12, wherein said lower stabilizer rod portion is adapted to be inserted through a central bore of a nut covering a steering stem of said motorcycle.

14. The tie down assembly of claim 13, wherein said height stop of said stabilizer rod rests on said nut.

15. A tie down bar assembly for use during transport of a faired sport motorcycle comprising:
 a horizontally disposed tie down bar having a center portion, a right end portion, and a left end portion, said right end portion and said left end portion being so positioned as to extend beyond a fairing of a motorcycle when placed perpendicular to said motorcycle;
 a stabilizer rod having an upper end attached to said center portion of said tie down bar and perpendicular thereto to form a T-bar configuration;
 said stabilizer rod being so configured as to be mountable along its length to said motorcycle in the vicinity of the steering mechanism of said motorcycle;
 said tie down bar further comprising a tie down ring mounted thereto at each end of for receiving tie down straps; and
 said tie down bar further comprising right and left handle bar hooks mounted to and depending therefrom, and spaced inward from said tie down rings, each handle bar hook having a hook portion and a shaft portion, said shaft portion being mounted for vertical adjustment relative to said tie down bar;
 said handle bar hooks being so disposed as to allow downward adjustment to engage right and left handle bars of said motorcycle, and then upward adjustment to hold said handlebars steady during transport.

16. The tie down assembly of claim 15, said stabilizer rod further comprising a stabilizer rod height stop located along the length thereof dividing said stabilizer rod into an upper and a lower portion, said height stop being so located and configured as to engage said motorcycle with said lower stabilizer rod portion and provide clearance with said upper stabilizer rod portion sufficient for said tie down bar to clear the handle bars and said fairing of said motorcycle.

17. The tie down assembly of claim 15, wherein said tie down bar is a rectangular conduit.

18. The tie down assembly of claim 17, wherein said end portions are closed.

19. The tie down assembly of claim 15, wherein said tie down bar is a channel opening downward.

20. The tie down assembly of claim 19, wherein said tie down end portions are closed.

* * * * *